T. Alsop,

Mill Gearing.

N° 79,537.  Patented July 7, 1868.

Witnesses;
John D. Bloor
Edwin James

Inventor;
Thomas Alsop.
per Holmead & Hollingshead
Attorneys

United States Patent Office.

THOMAS ALSOP, OF ELKHART, ILLINOIS.

Letters Patent No. 79,537, dated July 7, 1868.

IMPROVEMENT IN MILL-SPINDLE SPRINGS.

*The Schedule referred to in these Letters Patent and making part of the same.*

TO ALL WHOM IT MAY CONCERN:

Be it known that I, THOMAS ALSOP, of Elkhart city, Logan county, and State of Illinois, have invented certain new and useful Improvements in "Mill-Spindle Springs;" and I do hereby declare that the following is a full, clear, and exact description of the same, reference being had to the annexed drawings, and to the letters of reference marked thereon, making part of this specification, in which—

Figure 1:
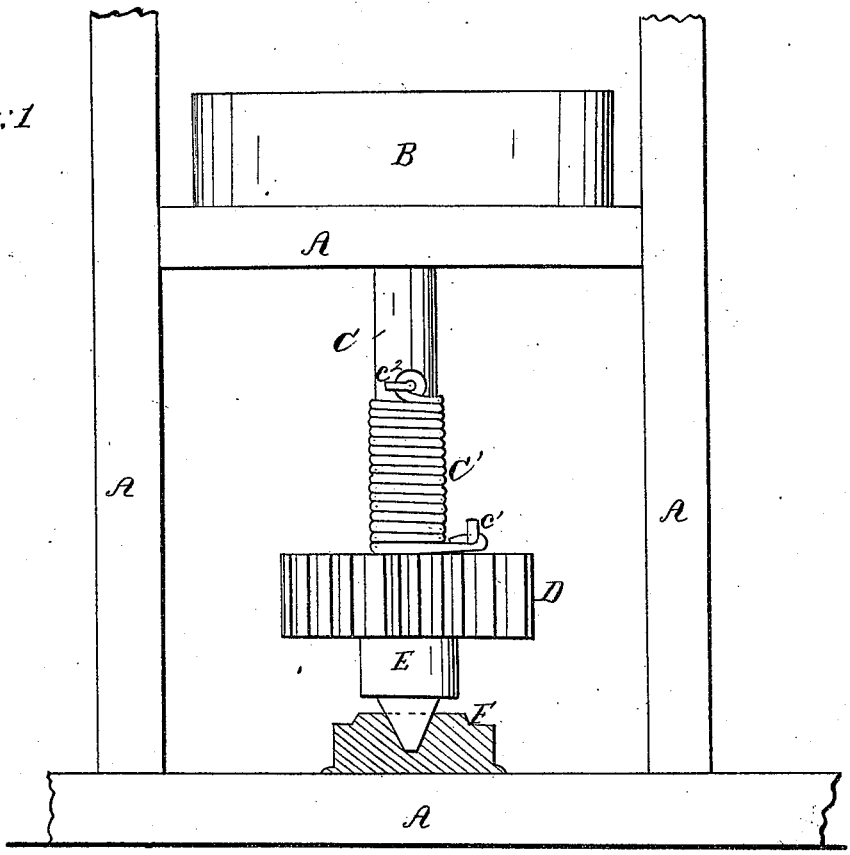
Figure 1 is a sectional view of my invention as applied to a mill-spindle, with the stone attached.
Figure 2:
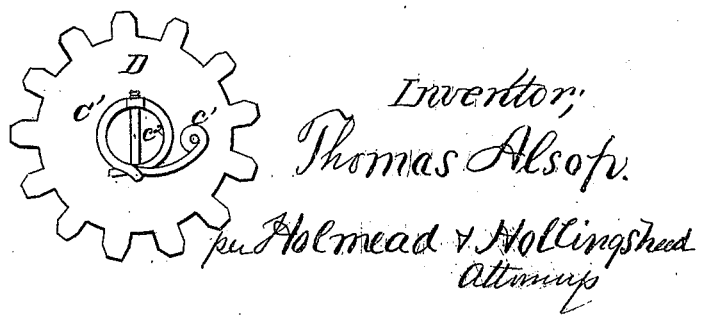
Figure 2 is a plan view of the pinion, with the spring attached, and showing the position of its free end when the same is detached from the spindle.

The nature of my invention consists in uniting a pinion-wheel to the spindle by means of a coil-spring, one end of the same being held by a stump or projecting pin on the upper face of the pinion, and the other by a removable bolt passing through the spindle.

The object of my invention is, by a simple and practical method, to afford a safe and sure connection between the pinion and spindle, one that can easily be detached, and one that, at the same time, entirely avoids all jarring in the starting of the machinery, no matter how sudden the same may be, thus freeing it of all the injurious influences arising from the "backlash," which practical experience has long since demonstrated is so destructive in all classes of mechanism, especially such as "mill-gearing."

In all other methods of connecting the spindle with the pinion, there is a "sudden start" the instant the power is applied, which causes necessarily a violent jar to the gearing. But by my method, when the machinery is started, before the spring reaches its full tension, sufficient "play" is allowed to avoid this entirely, the effect produced by the application of the power being gradual, until such a point is reached that allows the pinion to start without the slightest jar.

By the action of the spring, the pressure is continuous upon the pinion, and the force on the spindle is equalized, and the spring being so connected with the spindle, by means of a bolt or other suitable device, that when the same is removed, which can readily at any moment be done, the pinion, with the spring, can rise up on the spindle to such a degree of height as to insure of the same being thrown entirely out of gear. Or it is not necessary, even according to my plan, that the pinion should rise on the spindle in order that the machinery be thrown out of gear, for when the bolt is withdrawn, even should the pinion continue to revolve with its usual velocity, it fails to impart any momentum to the spindle.

The great advantage of this arrangement will readily suggest itself to any one in the slightest degree familiar with the various branches of the art to which my invention is applicable; e. g., in milling, it permits the miller to stop, and take up a millstone, dress it, put it down again, and set it running, without stopping the other machinery of the mill.

To enable others skilled in the art to make and use my invention, I will proceed to describe its construction and operation.

A is an ordinary framework, suitably arranged to contain the necessary mechanism. On the base of the frame A is arranged a suitable step, F, for the spindle to work in.

C is the spindle, having its lower bearing in the step F, and its upper in the cross-beam A' of the frame A. This spindle projects sufficiently far through the cross-beam A' to allow of its being firmly secured to the stone, B.

On the spindle C there is a friction-hub, E. This hub E furnishes a bearing for the pinion D.

On the upper face of the pinion D there is a stump or projecting pin, $c'$. Over one end of this pin $c'$ passes a loop, formed in one end of the coil-spring $C'$. This coil-spring $C'$ is wound around the spindle C, and its upper end firmly secured to the spindle C by means of a bolt, $c''$.

It will readily be seen that by withdrawing this bolt $c''$, the spring loses all power over the spindle C, and thus the pinion D can be allowed to rise on the spindle, or if the pinion is still left in gear with the driving-wheel, so as to revolve with its usual velocity, it fails to impart any momentum to the spindle C. But the chief advantage of my invention consists in the fact that the spring equalizes the draught, and avoids all the shock caused by the "sudden start," thus entirely avoiding the great evil incident to the "backlash."

Having thus fully described my invention, and the operation of the same, what I claim therein as new, and desire to secure by Letters Patent of the United States, is—

The spindle C and pinion D, in combination with the spring C', when the same is connected with the spindle and pinion by means of the projecting pin c' and removable bolt c'', and the whole is constructed and arranged substantially as and for the purpose specified.

In testimony whereof, I have signed my name to this specification in the presence of two subscribing witnesses.

THOMAS ALSOP.

Witnesses:
J. CARDEL,
C. ORENDORFF.